Feb. 11, 1941.  J. C. SHOEMAKER  2,231,352
SEED SUCKING COMBINE
Filed Oct. 21, 1937  2 Sheets-Sheet 1
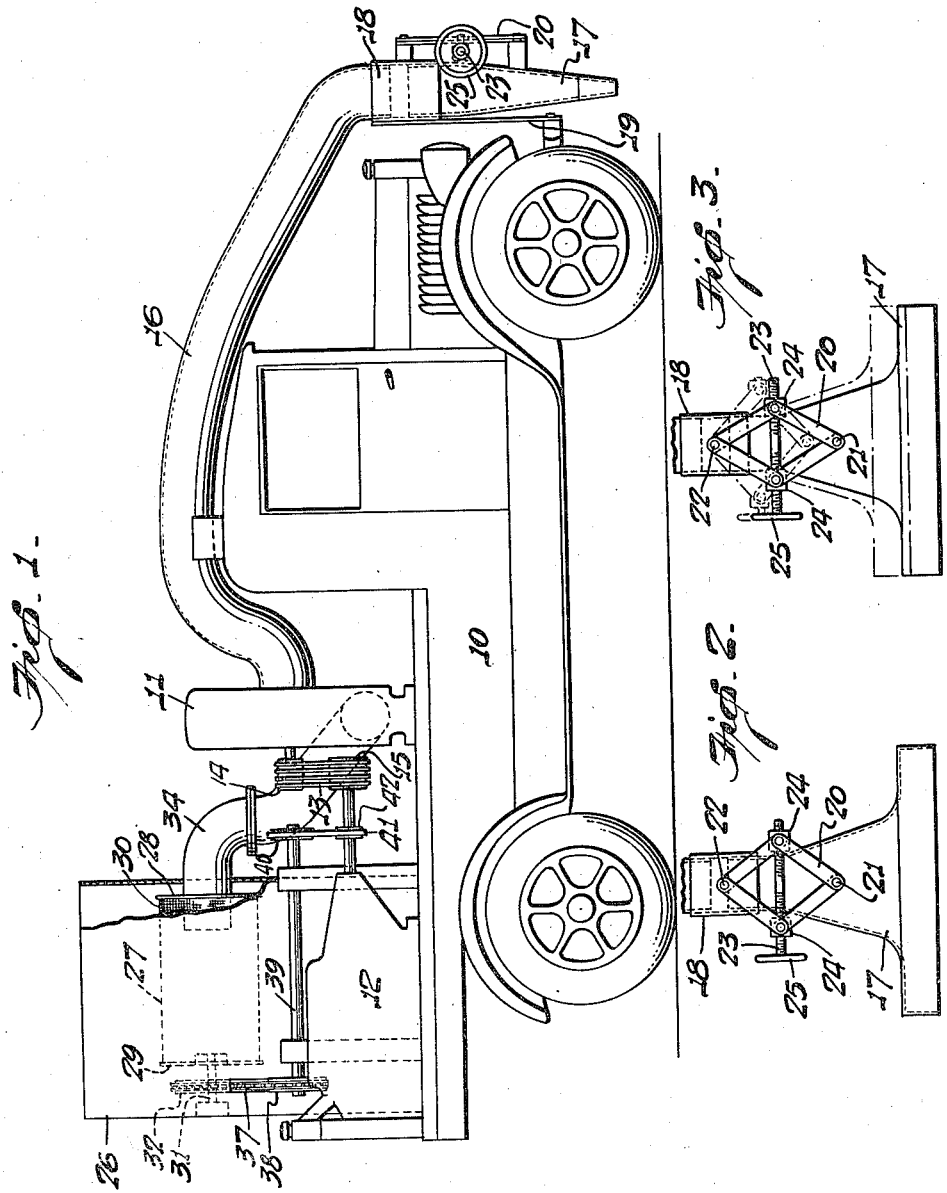
Inventor
Joseph C. Shoemaker
By Ernest S. Mechlin
Attorney

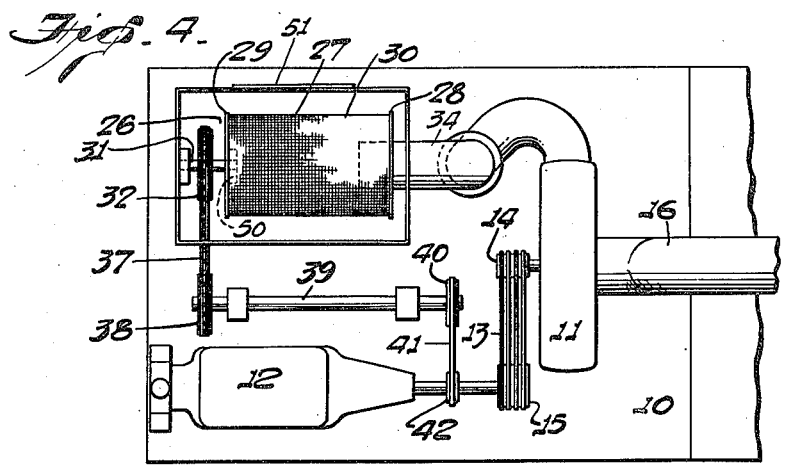
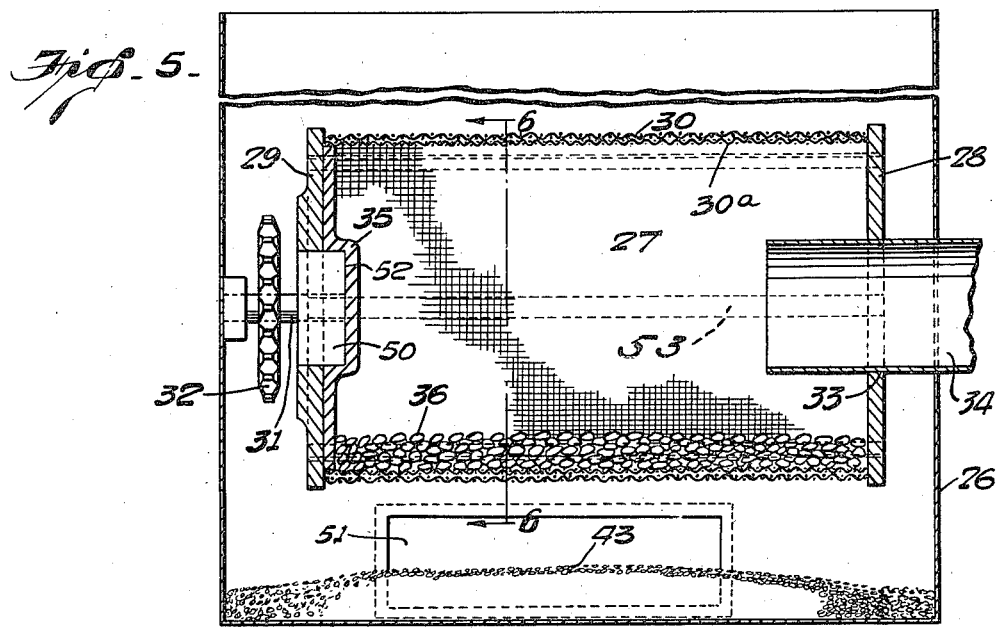
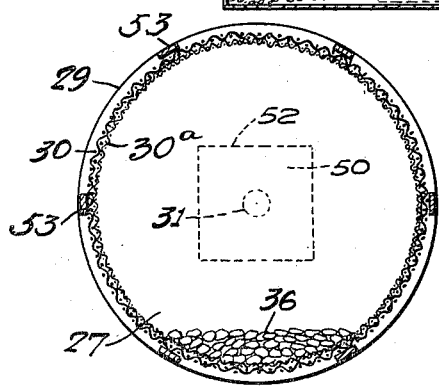
Inventor
Joseph C. Shoemaker
By Ernest F. Mechlin
Attorney Patented Feb. 11, 1941

2,231,352

UNITED STATES PATENT OFFICE 2,231,352

SEED SUCKING COMBINE

Joseph C. Shoemaker, Bridgeton, N. J., assignor to Mary E. S. Eisenhower, Bridgeton, N. J.

Application October 21, 1937, Serial No. 170,272

2 Claims. (Cl. 130—30)

The invention relates to harvesting devices and has for its general object the provision of a novel combined seed gathering or sucking up device and means for effecting threshing and cleaning thereof to make them more suitable for use, the invention having been designed particularly, though not necessarily, for the gathering up of dandelion seeds.

It is well known that dandelion seeds have a fluffy chute-like attachment which, in the ordinary course of events, enables them to be carried far and wide by the wind. In the commercial production of dandelion seeds these fluffy attachments should be removed and their presence has always been quite a matter of concern and inconvenience on account of packing unless specially treated by expensive processes to effect removal.

It is with the above and other objects in view that I have devised the present invention which involves the employment of a suction device which is suspended at the front of an appropriate truck and which gathers up the seeds by suction and blows them into a cleaning device from which the undesired fluff is blown out and within which the cleaned seeds are deposited.

An important object of the invention is to provide a machine of this type and for this purpose which involves but few parts and which may be readily mounted upon an existing truck and driven by a conventional automobile engine thereon.

Another object is to provide a simple and novel attachment for the necessary suction bit so that its height above the surface traveled over may be properly regulated.

A more specific object is to provide a rotary cleaner into which the seeds gathered up by the suction bit are blown and within which they are appropriately chafed to remove the fluff, means being also provided to protect the seeds against damage as a result of forceful impact against the cleaning device.

An additional object is to provide a device of this character which will be simple, easy to manufacture or assemble, positive in action, efficient and durable in service, and a general improvement in the art.

To the attainment of the foregoing and other objects and advantages, the invention preferably consists in the construction and arrangement of parts to be hereinafter more fully described and claimed, and illustrated in the accompanying drawings in which:

Figure 1 is a side elevation of the complete mechanism mounted on a truck.

Figures 2 and 3 are fragmentary detail views of a very convenient and satisfactory adjustment of the height of the suction bit.

Figure 4 is a plan view of the rear portion of the machine.

Figure 5 is a detail longitudinal section through the cleaning device and associated parts.

Figure 6 is a cross section on the line 6—6 of Figure 5.

Referring more particularly to the drawings, the numeral 10 designates, in general, a conventional or any preferred motor driven truck, the details of which are immaterial in so far as the present invention is concerned. Mounted on the intermediate portion of the truck is a conventional blower 11 adapted to be driven by a conventional engine 12, which might be of the Ford Model T type, the drive means being here represented as comprising belts 13 engaged about pulleys 14 on the blower shaft and also engaged about pulleys 15 on the motor shaft.

Leading into the front or suction end of this blower is a relatively large diametered air conduit 16 here extending up over the hood and cab of the truck and having its forward end carrying a suspended suction bit 17 which is preferably of a somewhat inverted T-shape. The upper end of the suction bit is embraced by a sleeve 18 which may be secured in place as by an arm 19 secured to it and to either the bumper or some other convenient part of the truck frame.

The purpose of this bit is to suck up seeds, of whatever sort are being raised, that are on or above the ground and growing in advance of the truck. As the plants are not necessarily of the same height, depending upon the crop being harvested, it becomes rather important to provide for vertical adjustment of the bit so that its height above the ground may be varied. While this might be done in several ways, I have illustrated a very simple and convenient mechanism for doing so. This means is here represented as comprising two pairs of toggles 20 having their converging lower ends pivoted at 21 upon the bit and having their converging upper ends pivoted at 22 upon the sleeve 18. It is, of course, to be understood that the bit is vertically slidable within the sleeve. For adjusting the position of the toggles and thereby changing the distance of the bit from the ground, I have disclosed a rod or screw 23 having oppositely threaded portions engaged through nuts 24 located at the other pivots of the pairs of toggles, as clearly shown in Figures 2 and 3. A hand wheel 25 is provided to facilitate turning the screw or rod and it will be observed that upon turning this screw in one direction the toggle structure will be extended laterally and result in raising the bit, as in Figure 2, whereas, upon turning it in the opposite direction the toggle structure will be elongated vertically, as shown in Figure 3, resulting in lowering the bit, as indicated by a comparison of the solid lines with the dot and dash lines in Figure 3.

Mounted upon the rear portion of the truck is the seed cleaning mechanism here shown as comprising a vertically elongated rectangular receptacle 26 open at the top and having a clean out door 51 on one side and containing a rotatably mounted reel or cylinder screen 27 having solid ends 28 and 29 and a double wire screen or foraminous cylindrical wall 30 and 30ª, the inner one being fine and supported by the coarse outer one. This screen or reel is mounted at one end on a rotatable shaft 31 carrying a square driving block 50 also carrying a drive sprocket 32 and suitably journaled within the receptacle 26. The screen, reel or drum is reinforced by slats or strips 53. The front end 28 is apertured at 33 for the reception of the rear end of an air conduit 34 which acts as an axis for one end of the cylindrical screen. This conduit 34 extends from the side of the blower 11 so that when the blower is operated to produce suction through the conduit 16 it will create a blast through the conduit 34. The rear end 29 is apertured at 52 to receive square driving block 50. Seeds thus sucked up by the bit and carried back through the blower and discharged through the outlet conduit 34 will impinge against the rear end wall of the rotary screen and, to avoid damage to them, I preferably line this rear end wall with some sort of suitable pad 35 which will take the force of the blow. Within the screen it is preferable to provide a quantity of pebbles or their equivalent, indicated at 36, so as to chafe and clean and separate the seeds from their fluff or hulls, etc.

The rotary screen or cleaner is driven by means of a chain 37 trained about the sprocket 32 and in turn engaged about a sprocket 38 on a counter-shaft 39 suitably journaled on the truck and equipped with a pulley 40 engaged by a belt 41 trained about a pulley 42 on the shaft of the motor 12. Some equivalent drive means might be used instead, but that shown and described has proved to be entirely satisfactory. It should also be mentioned in passing that the rotary screen structure is made in such manner that access is had to the interior through the open end 33 and it is likewise removable from within the receptacle 26 by pulling back pipe 34 and slipping screen endwise away from driving block 50 and lifting it out through open top of receptacle 26.

In the use of the machine, the truck is driven along over the field from which the seeds are harvested, it being first necessary to adjust the height of the suction bit to the most satisfactory level. The blower is driven by means of the motor 12 and the result will be a strong suction through the bit 17 and conduit 16, resulting in sucking up the seeds which are carried through the blower casing and discharged through the conduit 34 into the rotary reel or screen 27. As this screen or reel turns, the seeds entering it will be contacted by the stones or pebbles 36 and will be consequently cleaned of their fluff or hulls.

If dandelion seeds happen to be those that are harvested the light fluff, etc. on them will be sheared off and removed by rubbing the seed mass against the cylindrical wire screen and blown out through the cylindrical wall of the screen and discharged into the air at the open top of the receptacle 26, the heavier clean seeds then dropping down through the mesh of the screen and accumulating in a pile 43 at the bottom of the receptacle from which they may be afterwards removed through the door 51 provided for the purpose. If at any time undesired matter should accumulate within the rotary screen it can be removed from the receptacle, opened up and cleaned out as heretofore described.

Instead of being used to harvest a seed crop it is conceivable that the device may also be used as an insect exterminator, in which event they would be knocked off the plants by the bit 17 and sucked up and discharged into the rotary screen in identically the same manner as seeds. However, in this instance, the stones may be omitted and the rotary screen used as a trap which can be removed as described and the insects accumulated therein burned or otherwise destroyed.

From the foregoing description and a study of the drawings it will be apparent that I have thus provided a very simply constructed and easily operated machine for the purpose described and for other analogous uses which may suggest themselves, there being nothing complicated to get out of order so that the device should have a long and satisfactory life.

While I have shown and described the preferred embodiment of the invention, it should be understood that the disclosure is not limitative but, on the contrary, is simply illustrative of the principles involved, as the right is reserved to make all such changes and modifications as will not depart from the salient features of the invention or the scope of the claims hereunto appended.

Having thus described my invention, what I claim is:

1. A device for cleaning seeds comprising a blower, an open topped receptacle, a rotary power driven threshing and cleaning screen rotatably mounted in said receptacle and connected with said blower, and a mass of pebbles or the like within said screen acting to thresh, polish and clean seeds forced into said screen by said blower, whereby seeds cleaned by said pebbles will drop through the screen into the bottom of the receptacle and whereby objectionable matter chaffed from the seeds will be blown out through the wall of the screen and discharged at the open top of the receptacle.

2. A device for cleaning seeds comprising a blower, an open topped receptacle, a rotary power driven threshing and cleaning screen rotatably mounted in said receptacle and having solid end walls, one of said end walls being adapted to permit the introduction of seeds and air from said blower into said screen, and a mass of pebbles or the like within said screen acting to thresh, polish and clean seeds, whereby seeds cleaned by said pebbles will drop through the screen into the bottom of the receptacle and objectionable matter chafed off from the seeds will be blown out through the screen and discharged at the open top of the receptacle.

JOSEPH C. SHOEMAKER.